United States Patent [19]

Casas

[11] Patent Number: 4,973,027
[45] Date of Patent: Nov. 27, 1990

[54] JACK

[75] Inventor: Alain R. Casas, Vineuil, France

[73] Assignee: Automax, Mont-Pres-Chambord, France

[21] Appl. No.: 378,820

[22] Filed: Jul. 12, 1989

[30] Foreign Application Priority Data

Jul. 13, 1988 [FR] France ................................ 88 09587

[51] Int. Cl.⁵ ................................................ B66F 3/24
[52] U.S. Cl. .................................... 254/93 R; 92/177; 91/DIG. 4
[58] Field of Search ................. 92/177, 213, 222, 233; 91/DIG. 4; 254/93 R, 93 H

[56] References Cited

U.S. PATENT DOCUMENTS

| | | |
|---|---|---|
| 3,811,367 | 5/1974 | Bimba . |
| 3,822,966 | 7/1974 | McClocklin ...................... 254/93 H |
| 3,961,559 | 6/1976 | Teramachi ............................ 92/177 |
| 3,994,539 | 11/1976 | Gottlieb . |
| 4,114,517 | 9/1978 | Teramachi ............................ 92/177 |
| 4,351,229 | 9/1982 | Stoll ................................. 92/DIG. 4 |

FOREIGN PATENT DOCUMENTS

| | | |
|---|---|---|
| 0264682 | 4/1988 | European Pat. Off. . |
| 1231979 | 1/1967 | Fed. Rep. of Germany . |
| 2444314 | 4/1976 | Fed. Rep. of Germany . |
| 2741350 | 3/1979 | Fed. Rep. of Germany . |
| 1281714 | 4/1961 | France . |
| 2033537 | 5/1980 | United Kingdom . |

OTHER PUBLICATIONS

Patent Abstracts of Japan, vol. 6, No. 256, 12/15/82; JP-A-57-149659.

Primary Examiner—Robert C. Watson
Attorney, Agent, or Firm—Kenyon & Kenyon

[57] ABSTRACT

A jack comprising a casing consisting of two flanges connected by a tubular element in which is sliding a piston connected to a rod itself slidably mounted to extend through one flange, the ends of the tubular element which is oval in cross-section as well as the piston being fast with the flanges, respectively, through a double crimping, namely a crimping of the ends of the tubular elements onto the flanges and a crimping of the flanges onto these ends.

6 Claims, 2 Drawing Sheets

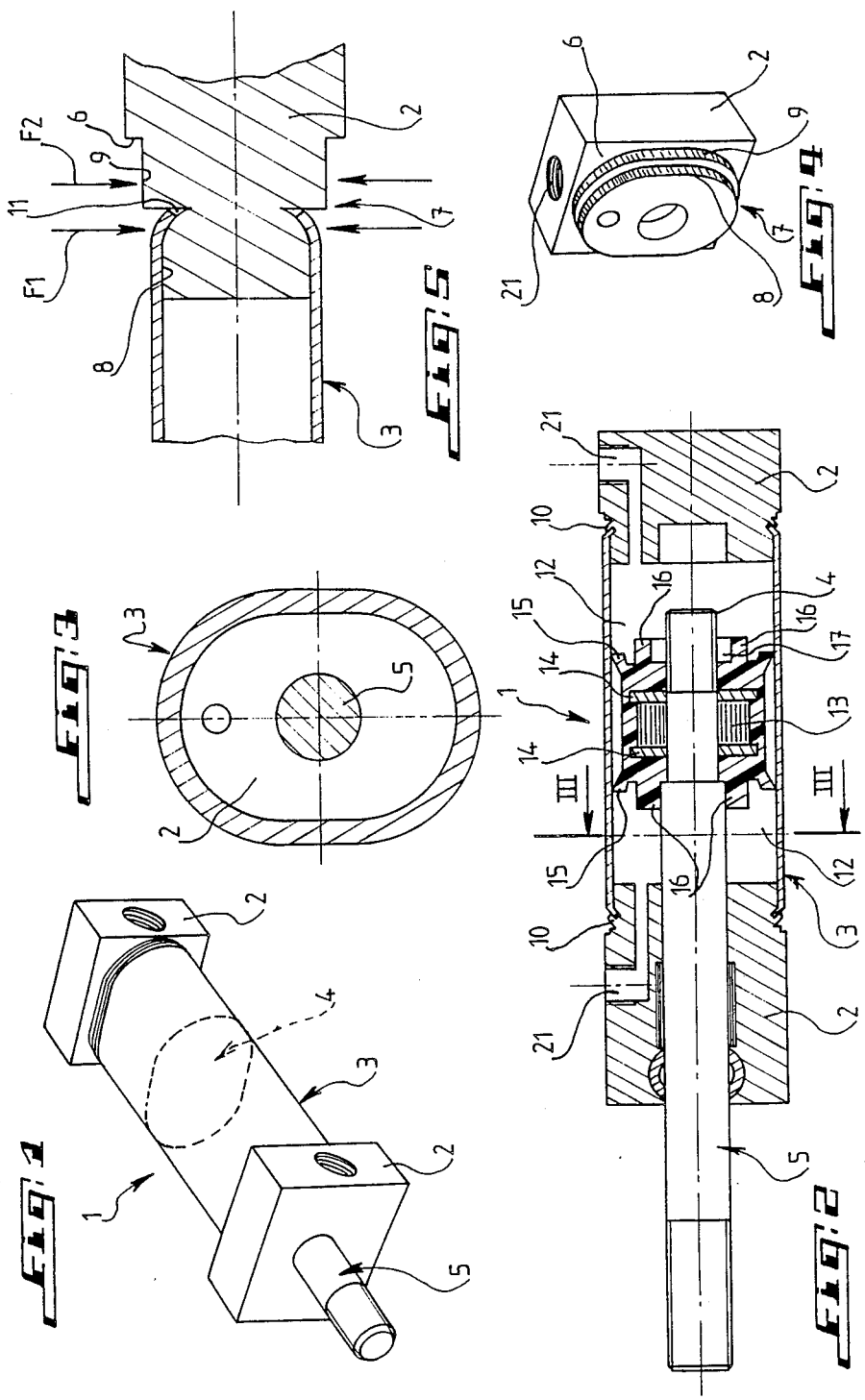

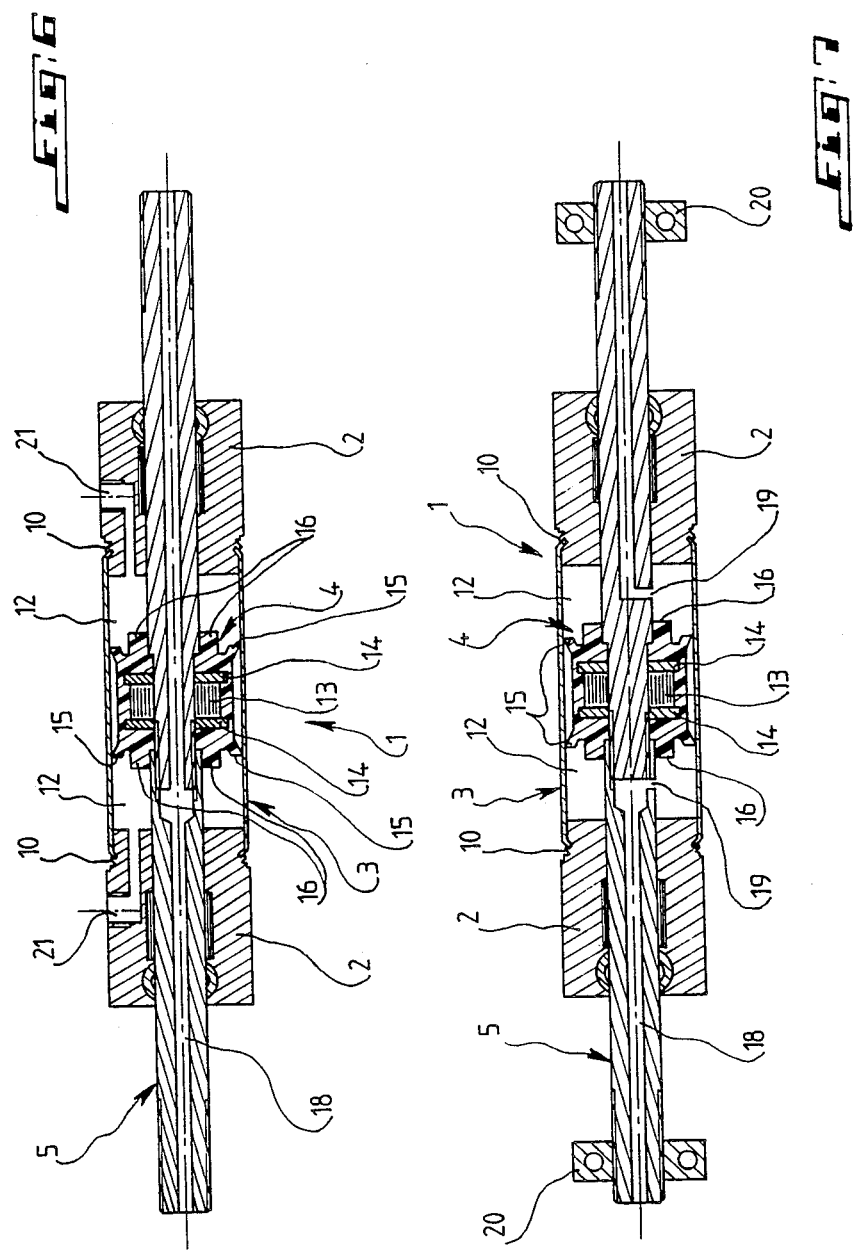

JACK

The present invention relates generally to jacks and like ram-like actuators and is more particularly directed to a small very improved pneumatic jack usable in various applications.

Since long ago are already known jacks comprising a body or casing consisting of two flanges connected by a tubular element in which is sliding a piston connected to a rod or the like itself slidably mounted to extend through at least one of the two flanges, it being understood that the casing comprises ports of fittings providing for the supply and discharge of a fluid.

To carry out the connection or assembly of the tubular element and of both flanges, several solutions have already been proposed.

Thus such an assembly may be carried out by screwing the tubular element onto the flanges and by using screw-threaded rods or tire bolts clamping both flanges against the ends of the tubular element arranged therebetween.

Also proposed have been jacks consisting of an integral tubular casing one end of which is open and may possibly comprise a flange defining together with the casing an inner chamber in which is sliding the piston of the jack.

All these approaches however are not satisfactory because they suffer from inconveniences in particular with respect to the bulk or size and to the complications and manufacturing costs and these approaches moreover are neither advantageous nor reliable in respect of the manufacture of very small of miniaturized jacks.

Therefore the object of the invention is to remove in particular the above-mentioned drawbacks by providing an improved jack or ram-like actuator which may be very small, this jack being very easy and cheap to manufacture and exhibiting an outstanding operating reliability irrespective of its use whatsoever.

For that purpose the subject matter of the invention is an improved jack forming for instance a very small pneumatic jack comprising a casing or body consisting of two flanges connected by a tubular element in which is sliding a piston connected to a rod or the like itself slidably mounted to extend through at least one of the two flanges, characterized in that the ends of the tubular element, preferably of oval shape in cross-section as well as the piston are made fast with the flanges, respectively, by a double crimping, namely a crimping of the said ends upon the flanges and a crimping of the flanges upon these ends.

According to another characterizing feature of the invention, the confronting faces of both flanges comprise each one an end portion with two adjacent stepped shoulders making possible the aforesaid double crimping.

According to still a further characterizing feature of the invention, a groove is formed on the end portion at the zone of connection of both shoulders so as to make possible in a first operating step the crimping of the ends of the tubular element after nesting or fitting onto the outermnost shoulder of the end portion.

The jack device according to this invention is further characterized by a turning down of the innermost shoulder of the end portion over the ends of the tubular element previously crimped into the aforesaid groove.

According to another characterizing feature of this invention, the oval piston sliding within the tubular element is made from a plastics material moulded over a magnet arranged between two braces through which the aforesaid rod extends as well as through the magnet.

Both opposite sides of the piston advantageously comprise each one at their peripheries an annular sealing lip bearing upon the inner wall of the tubular element.

There is also provided in at least one of the sides of the piston two lugs or the like which may serve as an accommodation for a nut into which would be screwed the end of the rod connected to the piston and extending in sliding relationship through one of the two flanges of the casing of the jack.

According to another embodiment, a rod slidably mounted to extend through both flanges and provided with an axial bore to allow any fluid whatsoever to flow therethrough extends through the piston.

This axial bore may open on either side of the flanges of the piston into two chambers defined by this piston, the tubular element and both flanges so as to make possible the displacement of the jack casing with respect to the said rod, which may be useful in particular applications.

The invention will be better understood and further objects, characterizing features, details and advantages thereof will appear more clearly as the following explanatory description proceeds with reference to the accompanying diamgrammatic drawings given by way of non limiting examples only illustrating several presently preferred specific embodiments of the invention and wherein:

FIG. 1 is a diagrammtic perspective view of a jack according to the principles of this invention;

FIG. 2 is a view in axial section of this jack;

FIG. 3 is a view in section taken upon the line III-—III of FIG. 2;

FIG. 4 is a perspective view of one of the flanges;

FIG. 5 is an enlarged partial view in axial section of one of the flanges and shows the manner in which the double crimping is performed to make possible the connection of the flanges to the tubular element, only the first crimping of the tubular element onto the outermost shoulder of the end portion being shown;

FIG. 6 is a view in axial section of another embodiment of the jack according to the invention; and FIG. 7 is a view in axial section of still another alternative embodiment of this jack.

Referring to FIGS. 1, 2, 6 and 7, there is seen a jack comprising a casing consisting of two flanges 2 connected to the ends of a tubular element 3 in which is sliding a piston 4 connected to a rod 5 itself slidably mounted to extend through at least one of the two flanges 2.

All the above arrangements are well known per se and do not require any additional explanations.

According to the invention the ends of the tubular element 3 are made fast with the flanges 2, respectively, owing to a double crimping to be described in detail hereinafter.

Referring more particularly to FIGS. 4 and 5 there is seen that each flange 2 comprises on one 6 of its faces, namely the face which is in front of that of the other flange, an end portion 7 comprising two adjacent step shoulders, namely a shoulder 8 which forms the outermost shoulder of the end portion 7 and a shoulder 9 which forms the innermost shoulder of the said end portion.

At 10 on FIGS. 2, 6 and 7 is shown a turning down of the innermost shoulder 9 over the ends of the tubular element 3 after these ends having been crimped into a groove 11 formed on the end portion 7 at the zone of connection of both elements 8 and 9, the said groove being clearly visible on FIG. 5.

As well shown on FIG. 3 the tubular element 3 advantageously exhibits an oval shape in cross-section as well as the piston 4 which is sliding within this tubular element, which piston will be described hereinafter and is advantageously held against rotary motion within the tubular element 3 during its reciprocating movements within the chamber 12 defined by the tubular element 3 and the flanges 2.

The oval piston 4 is advantageously made from a suitable plastics material such as polyurethane moulded over or about a magnet 13 interposed between two braces 14 which also are sunk or embedded within the plastics material as is well seen on FIGS. 2, 6 and 7.

Both opposite sides of the piston 4 comprise each one at their peripheries an annular sealing lip 15 projecting outwards and likely to bear upon the inner wall of the tubular element 3.

Also both opposite sides of the piston 4 comprise each one two lugs designated at 16 on FIGS. 2, 6 and 7, respectively.

According to the embodiment shown on FIG 2, both lugs 16 of one of the sides of the piston 4 serve advantageously as an accommodation for a nut 17 into which is screwed the end of the rod 5.

According to the embodiment shown on FIG. 6, the rod 5 extends wholly through the piston 4 and is mounted to extend in sliding relationship through both flanges 2, in which case the lugs 16 would somewhat contribute to the fastening of the said rod 5 onto the piston 4.

In the present instance the rod 5 is provided with an axial bore 18 permitting the flow of any fluid whatsoever therethrough which could thus be carried from one point to another one irrespective of the displacements of the piston 4 within the tubular element 3. Somewhat the same structure may be found on the alternative embodiment of FIG. 7 but here the bore 18 of the rod 5 opens at 19 on either side of the faces of the piston 4 into both chambers 12 defined by this piston, the tubular element 3 and the flanges 2.

The rod 5 is fastened by screw-threading for instance at both of its ends onto any part 20 whatsoever and it is understandable that the feeding of an hydraulic fluid or of air under pressure to one end or the other one of the rod 5 would operate the displacement of the jack casing 1 in one direction or in the other one with respect to the rod 5 which would remain stationary.

This would not be the case with the embodiments shown on FIGS. 2 and 6 wherein the flanges 2 comprise each one as known per se ports 21 for the communication of the chamber 12 with a suitable fluid source not shown. In this case it is the piston 4 hence the rod 5 coupled to this piston which would move with respect to the jack casing which would be stationary.

As known per se, seals or like fluid-tight packings which are shown on FIGS. 2, 6 and 7 are provided between the flanges 2 and the rod 5, such seals making of course possible the relative sliding motion of the rod 5 and of the jack casing 1.

For a better understsanding of the invention, there will now be explained in detail how the connection of the flanges 2 to the tubular element 3 is carried out with reference more particularly to FIG. 5.

The ends of the tubular element 3 are at first nested or fitted over the oval outermost shoulder 8 of the end portion 7 of the flanges 2.

Then is applied through milling or rolling for instance a force directed according to the arrow F1 and which would cause the end of the oval tubular element 3 to be crimped into the groove 11.

The milling rollers are then displaced so as to exert a force in the direction of the arrow F2 upon the innermost shoulder 9 of the end portion 7, thereby carrying out a turning down 10 (FIGS. 2, 6 and 7) of one part of the shoulder over and against the end of the oval tubular element 3 previously crimped into the groove 11.

Thus has been provided according to the invention a particularly simple jack of cheap manufacture and which may find multiple applications requiring in particular the use of jacks of very small sizes or bulks.

It should be understood that the invention is not at all limited to the embodiments described and shown which have been given by way of illustrative examples only.

Thus there could quite be provided onto the jack casing systems or devices for detecting or sensing the position of the piston and co-operating with the magnet embedded within this piston. In this respect it should be pointed out that the braces on either side of the magnet not only make it possible to hold the magnet properly but also to perform a concentration of the magnetic field.

The invention comprises all the technical equivalents of the means described as well as their combinations if the same are carried out according to its gist and within the scope of the appended claims.

What is claimed is:

1. An improved jack forming a very small pneumatic jack for instance, comprising a casing consisting of two flanges connected by a tubular element in which is sliding a piston connected to a rod itself slidably mounted to extend through at least one of the two flanges, wherein the improvement consists in that the piston sliding within the tubular element and exhibiting like this element an oval shape in cross-section is made from a plastics material moulded over and about a magnet arranged between two braces through which the rod extends as well as through the magnet.

2. A jack according to claim 1, wherein both opposite sides of the piston comprise each one at their peripheries an annular sealing lip bearing upon the inner wall of the tubular element.

3. A jack according to claim 1, wherein at least one of the piston sides comprise two lugs serving as an accommodation for a nut into which is screwed the end of said rod.

4. A jack according to claim 1, wherein the rod slidably mounted to extend through both flanges and formed with an axial bore extends through said piston.

5. A jack according to claim 4, wherein said bore opens on either side of the faces of the piston into both chambers, respectively, defined by this piston, the tubular element and both flanges.

6. An improved jack forming a very small pneumatic jack for instance, comprising a casing consisting of two flanges connected by a tubular element in which is sliding a piston connected to a rod itself slidably mounted to extend through at least one of the two flanges, wherein the improvement consists in that the piston sliding within the tubular element and exhibiting like this element an oval shape in cross-section is made from a plastics material moulded over and about a magnet interposed between two braces which also are sunk or embedded within the plastics material and through which the rod extends as well as through the magnet.

* * * * *

UNITED STATES PATENT AND TRADEMARK OFFICE
CERTIFICATE OF CORRECTION

PATENT NO. : 4,973,027
DATED : 27 November 1990
INVENTOR(S) : Alain R. CASAS It is certified that error appears in the above-identified patent and that said Letters Patent is hereby corrected as shown below:

| Column | Line | |
|---|---|---|
| ABS. | 2 | Change "in which is sliding a" to --in which a sliding--. |
| ABS. | 3 | After "piston" insert --is--; after "rod" insert --which--; after "itself" insert --is--. |
| ABS. | 6 | After "being" insert --made--. |
| 1 | 10 | Delete "is sliding"; before "a piston" insert --sliding--; after "piston" insert --is--. |
| 1 | 11 | Before "itself" insert --which--; after "itself" insert --is--. |
| 1 | 13 | Change "of" to --or--. |
| 1 | 26 | Delete "is sliding". |
| 1 | 27 | After "jack" insert --is sliding--. |
| 1 | 33 | After "small" change "of" to --or--. |
| 1 | 44 | Delete "is sliding"; before "a piston" insert --sliding--; after "piston" insert --is--; before "itself" insert --which--; after "itself" insert --is--. |

UNITED STATES PATENT AND TRADEMARK OFFICE
CERTIFICATE OF CORRECTION

PATENT NO. : 4,973,027
DATED : 27 November 1990
INVENTOR(S) : Alain R. CASAS It is certified that error appears in the above-identified patent and that said Letters Patent is hereby corrected as shown below:

| Column | Line | |
|---|---|---|
| 1 | 53 | After "flanges" insert --each--. |
| 1 | 54 | Delete "each one". |
| 1 | 62 | Change "outermnost" to --outermost--. |
| 2 | 5 | Delete "each one". |
| 2 | 28 | Change "diamgrammatic" to --diagrammatic--. |
| 2 | 29 | Change "non limiting" to --non-limiting--. |
| 2 | 32 | Change "diagrammtic" to --diagrammatic--. |
| 3 | 20 | Delete "each one". |
| 3 | 24 | Delete "each". |
| 3 | 25 | Delete "one". |
| 3 | 49 | After "other" delete "one". |
| 3 | 51 | After "other" delete "one". |
| 4 | 20 | Delete "quite". |
| 4 | 34 | Delete "is". |
| 4 | 35 | Delete "sliding"; before "a piston" insert --sliding--; after "piston" insert --is--; after "rod" insert --which--; after "itself" insert --is--. |
| 4 | 43 | Delete "each one". |
| 4 | 59 | Delete "is". |

UNITED STATES PATENT AND TRADEMARK OFFICE
CERTIFICATE OF CORRECTION

PATENT NO. : 4,973,027

DATED : 27 November 1990

INVENTOR(S) : Alain R. CASAS

It is certified that error appears in the above-identified patent and that said Letters Patent is hereby corrected as shown below:

<u>Column</u>  <u>Line</u>

4  60  Delete "sliding"; before "a piston" insert --sliding--, after "piston" insert --is--; after "rod" insert --which--; after "itself" insert --is--.

Signed and Sealed this

Sixteenth Day of June, 1992

*Attest:*

DOUGLAS B. COMER

*Attesting Officer*   Acting Commissioner of Patents and Trademarks